(12) United States Patent
Iwasaki

(10) Patent No.: US 8,602,093 B2
(45) Date of Patent: Dec. 10, 2013

(54) COMPOSITE HEAT EXCHANGER AND COMPOSITE HEAT EXCHANGER SYSTEM

(75) Inventor: Mitsuru Iwasaki, Saitama (JP)

(73) Assignee: Calsonic Kansei Corporation, Saitama-ken (JP)

( * ) Notice: Subject to any disclaimer, the term of this patent is extended or adjusted under 35 U.S.C. 154(b) by 935 days.

(21) Appl. No.: 12/309,863

(22) PCT Filed: Jul. 26, 2007

(86) PCT No.: PCT/JP2007/064651
§ 371 (c)(1),
(2), (4) Date: Aug. 4, 2009

(87) PCT Pub. No.: WO2008/015954
PCT Pub. Date: Feb. 7, 2008

(65) Prior Publication Data
US 2009/0301411 A1      Dec. 10, 2009

(30) Foreign Application Priority Data

Aug. 2, 2006   (JP) ................................. 2006-210628
Dec. 21, 2006  (JP) ................................. 2006-344642

(51) Int. Cl.
F28F 9/02       (2006.01)
G05D 23/00      (2006.01)
F28D 5/00       (2006.01)
F25D 13/00      (2006.01)

(52) U.S. Cl.
USPC ................ 165/287; 165/173; 62/305; 62/458

(58) Field of Classification Search
USPC ..................... 165/140, 173, 287; 62/305, 428
See application file for complete search history.

(56) References Cited

U.S. PATENT DOCUMENTS

| | | | |
|---|---|---|---|
| 6,173,766 B1 * | 1/2001 | Nakamura et al. ........... | 165/176 |
| 6,182,744 B1 * | 2/2001 | Nakamura et al. ........... | 165/140 |
| 6,189,603 B1 * | 2/2001 | Sugimoto et al. ............ | 165/140 |
| 6,230,793 B1 * | 5/2001 | Sumida ......................... | 165/140 |
| 6,253,837 B1 * | 7/2001 | Seiler et al. ................... | 165/103 |
| 6,789,613 B1 * | 9/2004 | Ozaki et al. ................... | 165/140 |

(Continued)

FOREIGN PATENT DOCUMENTS

| | | | | |
|---|---|---|---|---|
| EP | 2218883 A1 * | 8/2010 | ............... | F01M 5/00 |
| JP | 2004-205192 | 7/2004 | | |

(Continued)

OTHER PUBLICATIONS

International Search Report mailed Sep. 4, 2007 for International Application No. PCT/JP2007/064651.

*Primary Examiner* — Mohammad M Ali
*Assistant Examiner* — Henry Crenshaw
(74) *Attorney, Agent, or Firm* — Wenderoth, Lind & Ponack, L.L.P.

(57) ABSTRACT

A composite heat exchanger system includes an air cooled condenser, a sub-radiator and a main radiator, and it is formed in a state where a tank of the sub-radiator is communicated with a tank of the main radiator. A water cooled condenser is contained in a tank of the sub-radiator. A part of a flowing medium that is cooled down by the main radiator is introduced in the sub-radiator to cool the flowing medium of the water cooled condenser. The flowing medium that is cooled down by the water cooled condenser is introduced in the air cooled condenser to be cooled.

11 Claims, 12 Drawing Sheets

(56) References Cited

U.S. PATENT DOCUMENTS

| | | | |
|---|---|---|---|
| 6,796,134 B1* | 9/2004 | Bucknell et al. | 62/133 |
| 2003/0188859 A1* | 10/2003 | Muramoto | 165/297 |
| 2004/0031595 A1* | 2/2004 | Iwasaki et al. | 165/135 |
| 2004/0112578 A1* | 6/2004 | Iwasaki | 165/165 |
| 2009/0301411 A1* | 12/2009 | Iwasaki | 123/41.23 |
| 2009/0301696 A1* | 12/2009 | Iwasaki | 165/140 |

FOREIGN PATENT DOCUMENTS

| | | | | |
|---|---|---|---|---|
| JP | 2004205192 A * | 7/2004 | | F25B 41/00 |
| JP | 2004-262330 | 9/2004 | | |
| JP | 2004262330 A * | 9/2004 | | B60H 1/32 |
| JP | 2005-186879 | 7/2005 | | |
| JP | 2005257104 A * | 9/2005 | | F28F 9/26 |
| JP | 2005-343221 | 12/2005 | | |

\* cited by examiner

COMPOSITE HEAT EXCHANGER AND COMPOSITE HEAT EXCHANGER SYSTEM

TECHNICAL FIELD

The present invention relates to a composite heat exchanger and a composite heat exchanger system which are adapted for a motor vehicle.

BACKGROUND OF THE INVENTION

Japanese Patent Application Laid-Open No. 2005-186879, which is invented the inventors of the present invention, discloses a technology of a composite heat exchanger and a composite heat exchanger system where a main radiator for cooling an engine and a sub-radiator for cooling a condenser are arranged.

SUMMARY

Problem(s) to be Solved by the Invention

However, in the conventional composite heat exchanger and composite heat exchanger system, flowing medium independently flows through the main radiator and the sub-radiator. As a result, there is a problem in that they increase the number of parts thereof and man hours for piping in addition to a lot of trouble of installing them on a motor vehicle.

The present invention is made to solve the above-described problem, and an object thereof is to provide a composite heat exchanger and a composite heat exchanger system that can improve the coolability of a main radiator and installation performance thereof on a motor vehicle, by using a part of flowing medium of the main radiator as flowing medium of a sub-radiator, and further and also by integrating the main radiator, the sub-radiator, a water cooled condenser and an air cooled condenser to be compact.

Means for Solving the Problems

According to a first aspect of the present invention there is provided a composite heat exchanger including an air cooled condenser having a pair of tanks and a core part arranged between the tanks thereof; a sub-radiator having a pair of tanks and a core part that is arranged between the tanks thereof and on the same plane as a plane of the core part of the air cooled condenser, the core part of the sub-radiator being formed with the core part of the air cooled condenser as one unit; and a main radiator having a pair of tanks and a core part that is arranged between the tanks thereof. One of the tanks of the sub-radiator is formed in a state where the one of the tanks is communicated with the downstream side tank of the main radiator in such a way that the one of the tanks of the sub-radiator is provided to project forward from the downstream side tank of the main radiator, being shaped like a rectangular box, so that the one of the tanks of the sub-radiator and the downstream side tank of the main radiator are formed as one unit. The other tank of the tanks of the sub-radiator is apart from an upstream side tank of the main radiator. One of the tanks of the sub-radiator contains a water cooled condenser. A part of a flowing medium that is cooled down by the main radiator is introduced in the sub-radiator to cool a flowing medium of the water cooled condenser, and the flowing medium that is cooled by the water cooled condenser is introduced in the air cooled condenser to be cooled.

According to a first aspect of the present invention there is provided composite heat exchanger system characterized in that a part of flowing medium that is cooled down by a main radiator for cooling an engine is introduced in a sub-radiator for cooling a condenser, and the part of the flowing medium is joined again with the flowing medium of the main radiator.

Effect of the Invention

The composite heat exchanger of the first invention includes the air cooled condenser having the pair of tanks and the core part arranged between the tanks thereof; the sub-radiator having the pair of tanks and the core part that is arranged between the tanks thereof and on the same plane as that of the core part of the air cooled condenser, the core part of the sub-radiator being formed with the core part of the air cooled condenser as one unit; and the main radiator having the pair of tanks and the core part that is arranged between the tanks thereof. The one of the tanks of the sub-radiator is formed in the state where the one of the tanks is communicated with the downstream side tank of the main tank. The one of the tanks of the sub-radiator contains the water cooled condenser. The part of the flowing medium that is cooled down by the main radiator is introduced in the sub-radiator to cool flowing medium of the water cooled condenser, and the flowing medium that is cooled by the water cooled condenser is introduced in the air cooled condenser to be cooled. Therefore, the part of the flowing medium can be used as the flowing medium of the sub-radiator, and the main radiator, the sub-radiator, the water cooled condenser and the air cooled condenser, which enables the coolability of mainly the main radiator and the installation thereof on the motor vehicle to be improved.

In the composite heat exchanger system of the second invention, the part of the flowing medium that is cooled down by the main radiator for cooling the engine is introduced in the sub-radiator for cooling the condenser, and the part of the flowing medium is joined again with the flowing medium of the main radiator. Therefore, the part of the flowing medium can be used as the flowing medium of the sub-radiator, and the number of parts and man hour for piping can be decreased, the composite heat exchanger system can be installed on a motor vehicle.

BRIEF DESCRIPTION OF THE DRAWINGS

The objects, features and advantages of the present invention will become apparent as the description proceeds when taken in conjunction with the accompanying drawings, in which.

DESCRIPTION OF REFERENCE NUMBERS

Figure 1:
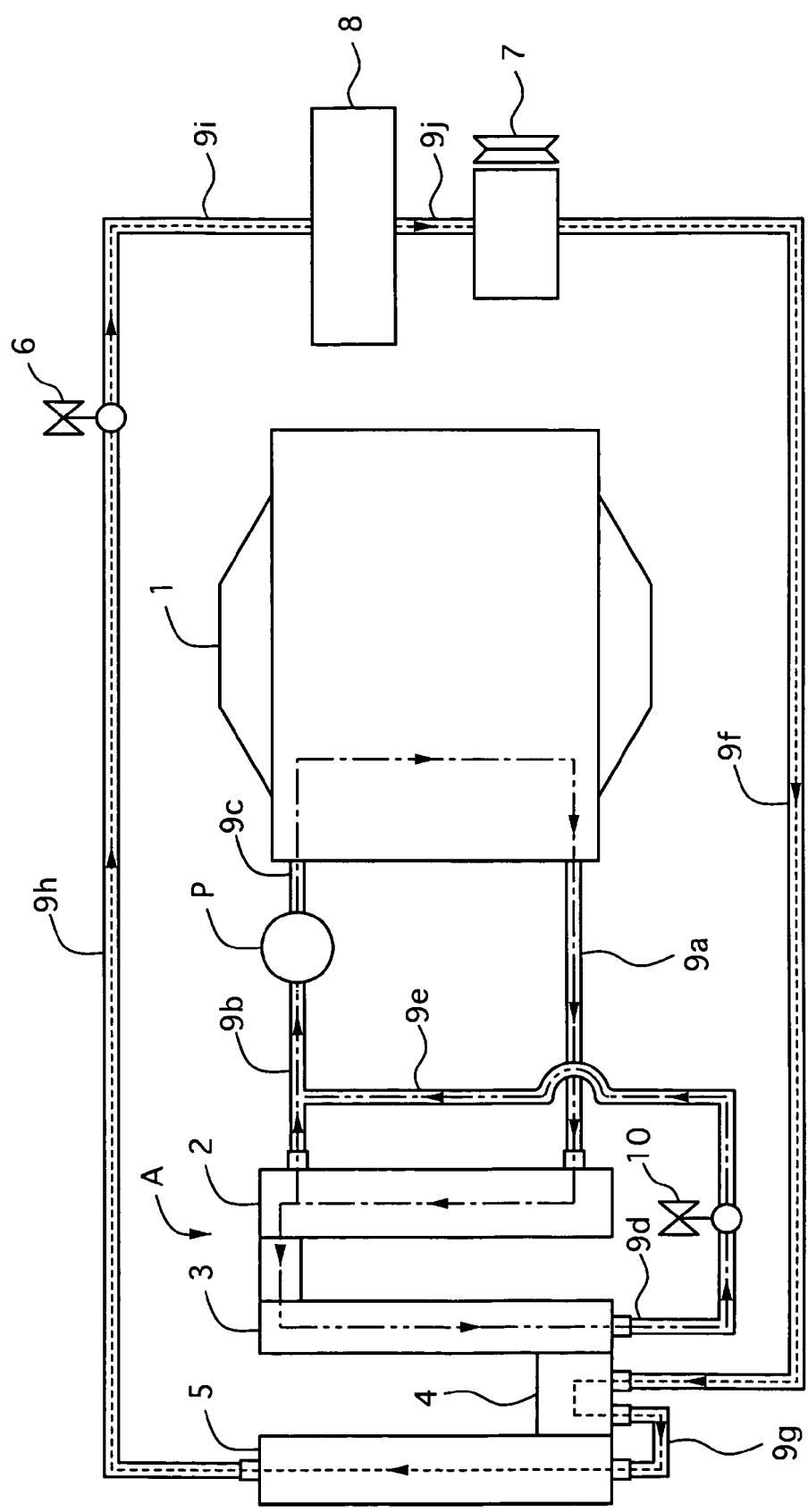
FIG. 1 is a diagram showing a system configuration of a composite heat exchanger of a first embodiment according to the present invention.

A, B, C, D, E, F composite heat exchanger
P pump
R1, R2, R3, R4, R5 first chamber, second chamber, third chamber, fourth chamber, fifth chamber
1 engine
2 main radiator
2a, 2b tank (of the main radiator)
2c core part (of the main radiator)
2d tube (of the main radiator)
2e fin (of the main radiator)
2f outlet port (of the main radiator)
2g inlet port (of the main radiator)
3 sub-radiator
3a, 3b tank (of the sub-radiator)
3c core part (of the sub-radiator)
3d tube (of the sub-radiator)
3e fin (of the sub-radiator)
3f outlet port (of the sub-radiator)
2h, 3g, 5g reinforcement member
4 water cooled condenser
4a inlet port (of the water cooled condenser)
4b outlet port (of the water cooled condenser)
5 air cooled condenser
5a, 5b tank (of the air cooled condenser)
5c core part (of the air cooled condenser)
5d tube (of the air cooled condenser)
5e fin (of the air cooled condenser)
5h, 5m partition part
5i, 5j connecting pipe (of a receiver)
5k receiver
5n inlet port (of the air cooled condenser)
5o outlet port (of the air cooled condenser)
6 expansion valve
7 compressor
8 evaporator
9a, 9b, 9c, 9d, 9e, 9f, 9g, 9h, 9i, 9j, 9k, 9m, 9n, 9o, 9p, 9q, 9r, 9s, 9t, 9u, 9v, 9w, 9x, 9y connecting pipe
10 temperature control valve
20a lower side tube
20b upper side tube
21 connecting port
40 shift control valve
50 turbo charger
50a compressor
50b turbine
51 water cooled intercooler
52 EGR cooler
60 outlet port

DETAILED DESCRIPTION OF THE INVENTION

Hereinafter, embodiments of the present invention will be described with reference to the accompanying drawings.

First Embodiment

Hereinafter, a composite heat exchanger and a composite heat exchanger system of a first embodiment will be described.

Figure 2:
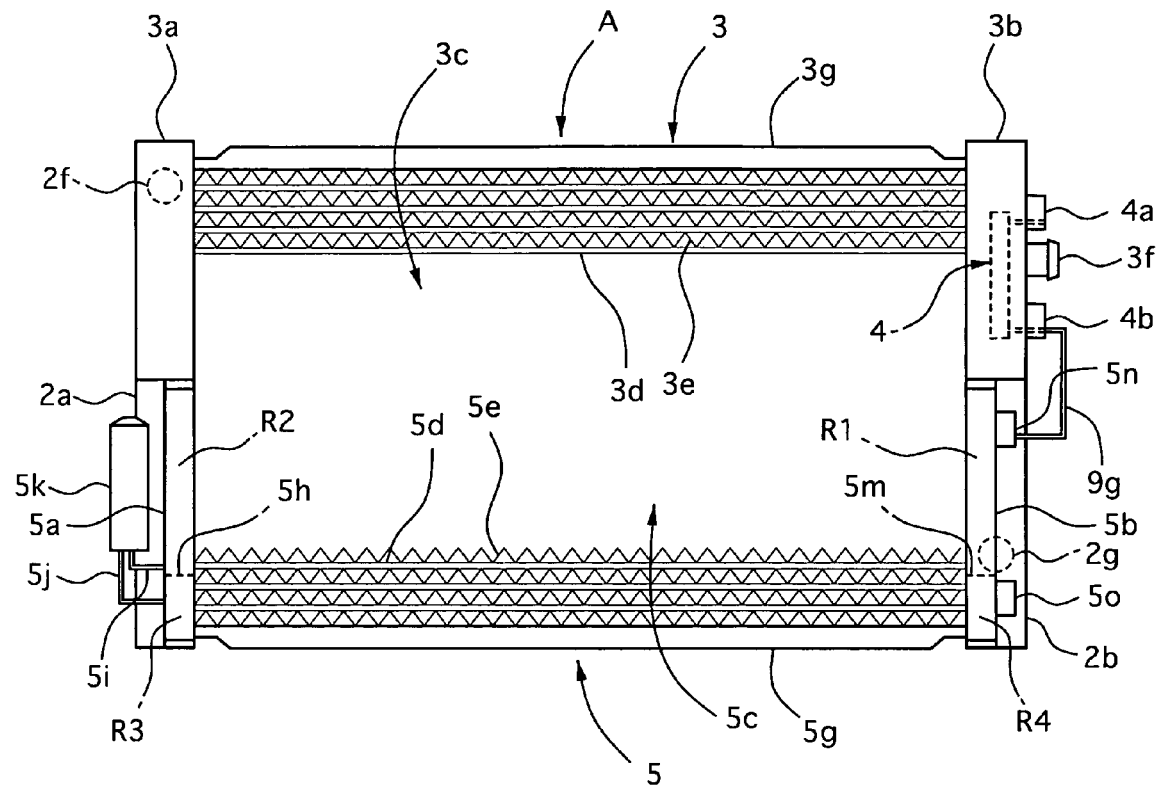
FIG. 2 is a front view of the composite heat exchanger of the first embodiment.
Figure 3:
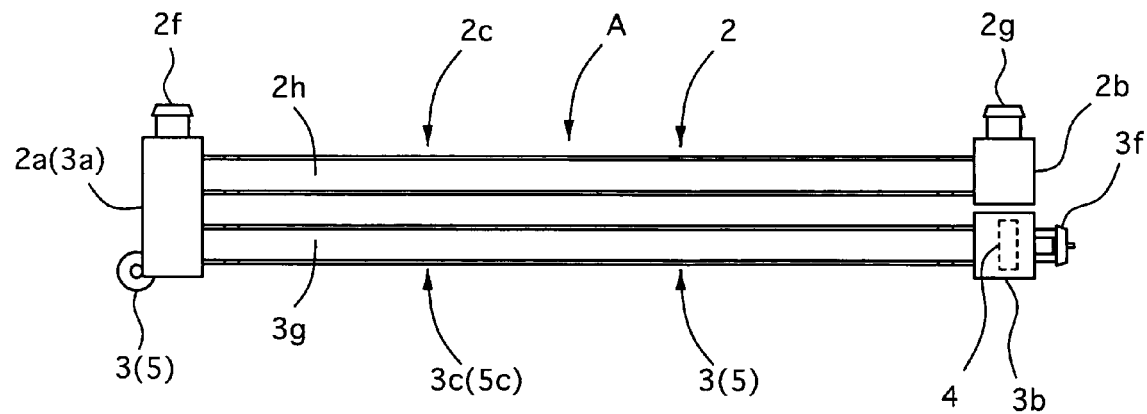
FIG. 3 is a plan view of the composite heat exchanger of the first embodiment.
Figure 4:
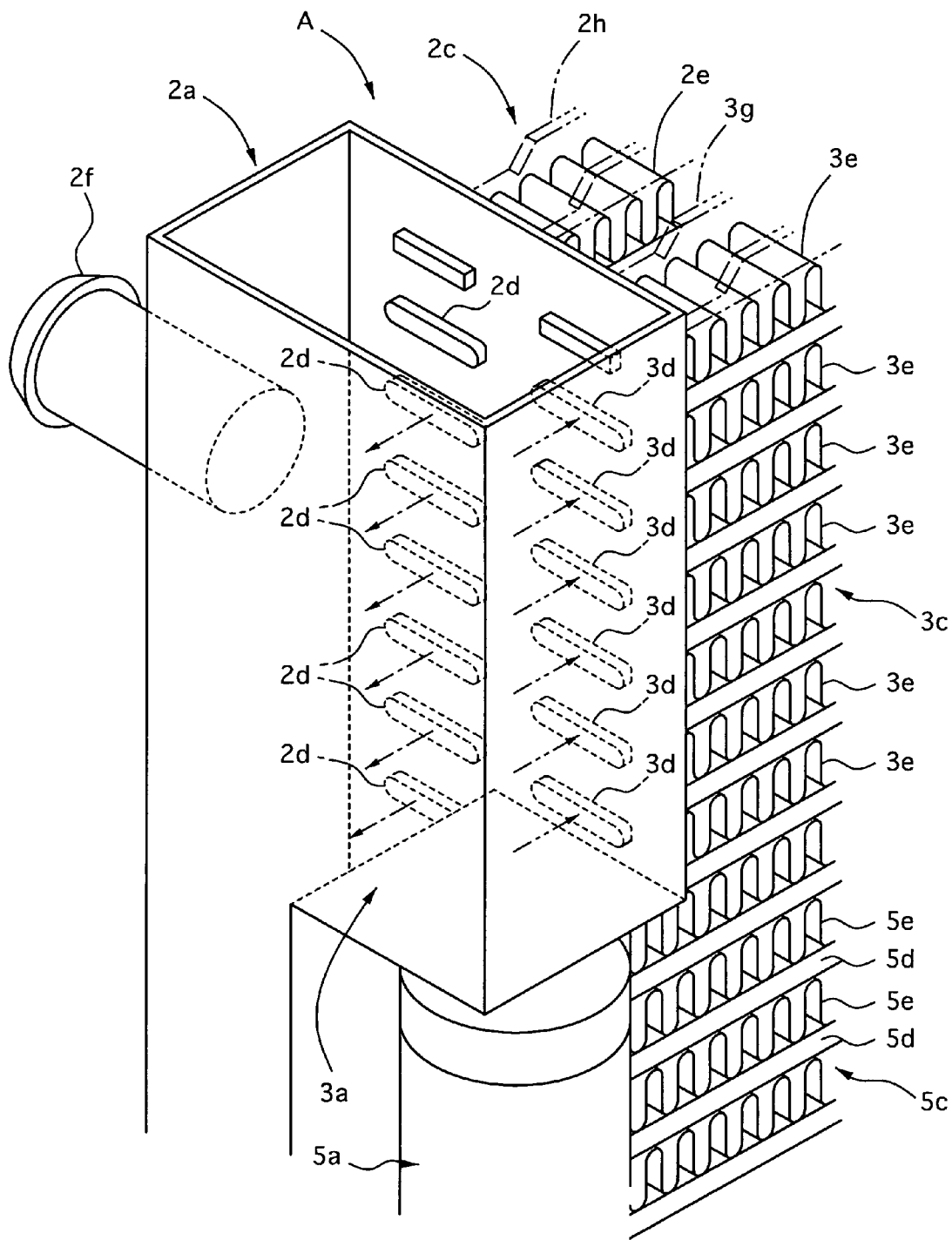
FIG. 4 is an enlarged partial view illustrating an interior of a tank of a sub-radiator that is used in the first embodiment.
Figure 5:
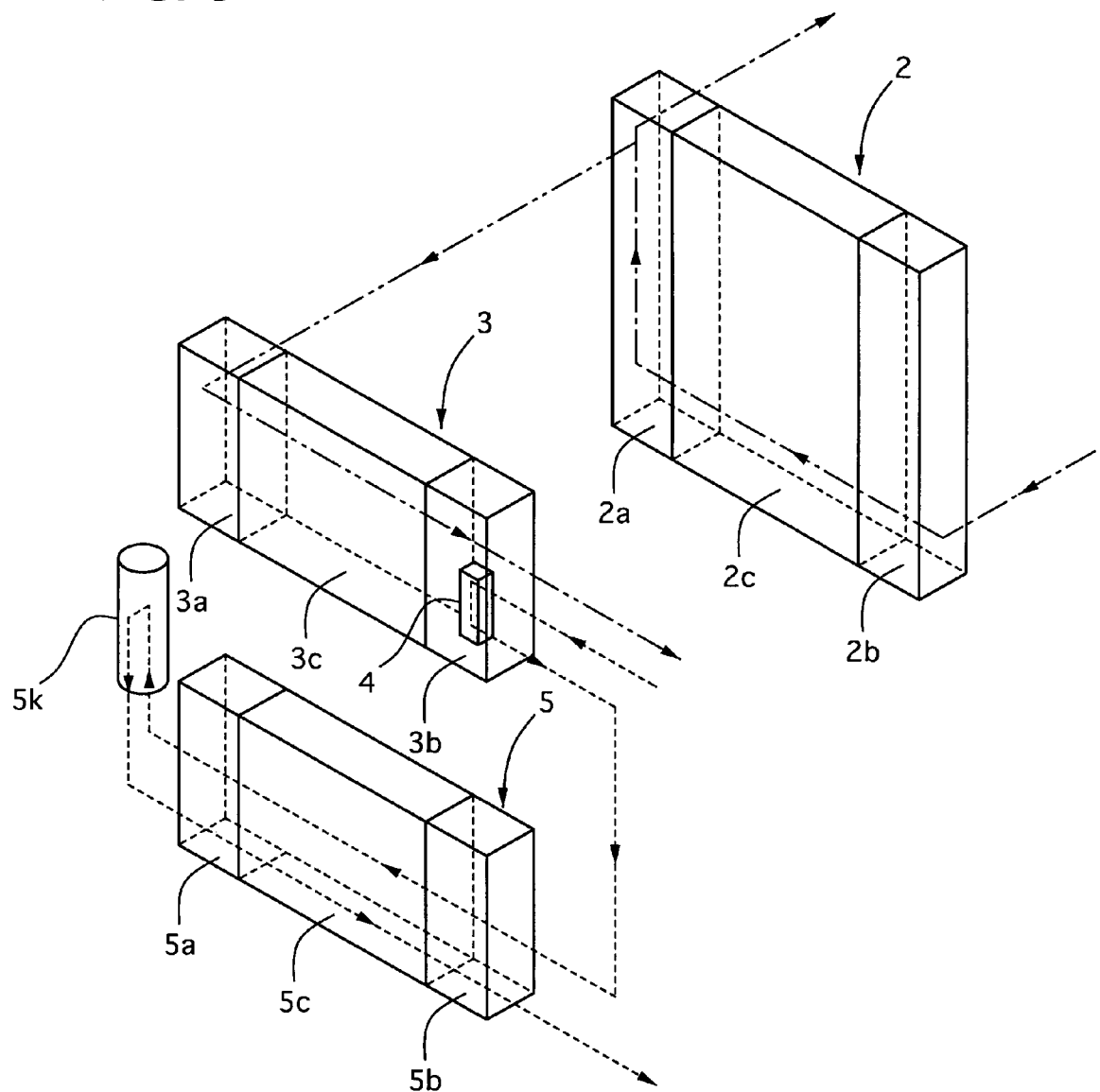
FIG. 5 is a diagram illustrating flow directions of flowing medium of the composite heat exchanger of the first embodiment.

FIG. 1 is a diagram showing a system configuration of the composite heat exchanger, FIG. 2 is a front view of the composite heat exchanger of the first embodiment 1, FIG. 3 is a plan view of the composite heat exchanger of the first embodiment, FIG. 4 is a diagram illustrating an interior of a tank of a sub-radiator of the first embodiment, and FIG. 5 is a diagram illustrating flow directions of flowing medium of the composite heat exchanger of the first embodiment.

First, an entire construction of the composite heat exchanger and the composite heat exchanger system of the first embodiment will be described.

As shown in FIG. 1, a motor vehicle, to which the composite heat exchanger A of the first embodiment is applied, is provided with an engine 1, a main radiator 2, a sub-radiator 3, a water cooled condenser 4, an air cooled condenser 5, an expansion valve 6, a compressor 7 and an evaporator 8.

The main radiator 2 is introduced with the flowing medium that is outputted from the engine 1 through a connecting pipe 9a at high temperature to cool the flowing medium, then circulating the flowing medium to the engine 1 through a connecting pipe 9b, a pump P and a connecting pipe 9c, as indicated by an alternate long and short dash lined arrow.

The sub-radiator 3 is introduced with a part of the flowing medium of the main radiator 2 to cool the part of the flowing medium, then joining the flowing medium thereof together with the flowing medium of the main radiator 2 after the flowing medium passes through connecting pipes 9d and 9e and a temperature control valve 10, as indicated by an alternate long and two-short dash lined arrow. The temperature control valve 10 corresponds to a temperature regulating means of the present invention.

The water cooled condenser 4 is introduced with the flowing medium at high temperature from the compressor 7 through a connecting pipe 9f to cool the flowing medium thereof by using the flowing medium of the sub-radiator 3, then outputting the flowing medium to the air cooled condenser 5 through a connecting pipe 9g.

The air cooled condenser 5 is introduced with the flowing medium outputted from the water cooled condenser 4 to further cool the flowing medium thereof, then circulating the flowing medium to the compressor 7 after the flowing medium flows into the expansion valve 6 and the evaporator 8 in these order through connecting pipes 9h to 9j.

That is, in the composite heat exchanger of the first embodiment, the part of the flowing medium that is cooled by the main radiator 2 that cools the engine 1 is introduced into the sub-radiator 3 that cools the condenser, where the flowing medium of the sub-radiator 3 cools the flowing medium of the water cooled condenser 4, then joining again with the flowing medium of the main radiator 2.

Accordingly, the sub-radiator 3 can aid the main radiator 2, and the water cooled condenser 4 can aid the air cooled condenser 5.

Further, the temperature control valve 10 is provided between the connecting pipes 9d and 9e arranged at an outlet port side of the flowing medium of the sub-radiator 3, so that it can regulate the temperature of the flowing medium of the sub-radiator 3.

The temperature control valve 10 employs a thermostat, or an electromagnet valve that is controlled to open and close based on the temperature of the flowing medium of the sub-radiator 3 detected by a temperature sensor. It is desirable to use a valve that can control the flow amount of the flowing medium by minute amounts.

Further, the above-described main radiator 2, the sub-radiator 3, the water cooled condenser 4 and the air cooled condenser 5 are constructed to form the composite heat exchanger A as one unit.

Hereinafter, a structure of the composite heat exchanger A will be described in detail.

As shown in FIGS. 2 to 4, the composite heat exchanger A of the first embodiment has the main radiator 2, the sub-radiator 3, the water cooled condenser 4 and the air cooled condenser 5.

The main radiator 2 includes a pair of tanks 2a and 2b and a core part 2c that is arranged between the pair of the tanks 2a and 2b.

As shown in FIG. 4, the core part 2c of the main radiator 2 consists of a plurality of flat tubes 2d and a plurality of corrugated fins 2e, where both end portions of the flat tubes 2d are inserted into and fixed to the corresponding tanks 2a and 2b, respectively, and each of the corrugated fins 2e are disposed between the adjacent tubes 2d.

An outlet port 2f is provided in a rear surface of an upper portion of the tank 2a of the main radiator 2 to be fluidically communicated with an interior of the tank 2a and also connected with the connecting pipe 9b. A tank 3a of the sub-radiator 3, which will be later described, is provided to project forward from the tank 2a of the main radiator 2, being shaped like a rectangular box. The tank 2a and the tank 3a are formed together with each other as one unit so that they can be fluidically communicated with each other.

On the other hand, an inlet port 2g, as shown in FIGS. 2 and 3, is provided in a rear surface of the tank 2b of the main radiator 2 to be fluidically connected with the connecting pipe 9a.

In addition, upper and lower side end portions of the core part 2c of the main radiator 2 are reinforced by two reinforcement members 2h (one of them is shown in FIG. 4) both end portions of which are inserted in and fixed to the corresponding tanks 2a and 2b, respectively.

The sub-radiator 3 includes a pair of tanks 3a and 3b and a core part 3c that is arranged between the pair of tanks 3a and 3b.

The core part 3c of the sub-radiator 3 has a plurality of flat tubes 3d and a plurality of corrugated fins 3e, where both end portions of the flat tubes 3d are inserted into and fixed to the corresponding tanks 3a and 3b, respectively, and each of the corrugated fins 3e are disposed between the adjacent tubes 3d.

The tank 3a of the sub-radiator 3a is formed together with the tank 2a of the main radiator 2 as one unit in a state where they are fluidically communicated with each other, as described above, while the tank 3b of the sub-radiator 3 contains the water cooled condenser 4. In addition, the tank 3b is apart from the tank 2b of the main radiator 2 as shown in FIG. 3.

In addition, an outlet port 3f is provided in a side surface of the tank 3b to be connected with the connecting pipe 9d in a state where it is fluidically communicated with an interior of the tank 3b.

Further, an upper end portion of the core part 3c of the sub-radiator 3 is reinforced by a reinforcement member 3g, both end portions of which are inserted in and fixed to the corresponding tanks 3a and 3b, respectively.

The water cooled condenser 4 is provided with an inlet port 4a and an outlet port 4b that are connected with the connecting pipes 9f and 9g, respectively, in a side surface of the tank 3b.

The water cooled condenser 4 may have appropriate structures, such as a normal housing-type oil cooler and evaporator.

The air cooled condenser 5 includes a pair of tanks 5a and 5b and a core part 5c that is arranged between the pair of tanks 5a and 5b.

The core part 5c of the air cooled condenser 5 is arranged on the same plane as that of the core part 3c of the sub-radiator 3, being formed together therewith as one unit. It has a plurality of flat tubes 5d and a plurality of corrugated fins 5e, where both end portions of the flat tubes 5d are inserted in and fixed to the corresponding tanks 5a and 5b, respectively, and each of the corrugated fins 5e is disposed between the adjacent tubes 5d.

In addition, a lower end portion of the core part 5c of the air cooled condenser 5 is reinforced by a reinforcement member 5g, both end portions of which are inserted in and fixed to the corresponding tanks 5a and 5b, respectively.

As shown in FIG. 2, an interior of the tank 5a of the air cooled condenser 5 is divided into two chambers, namely a second chamber R2 and a third chamber R3, by a partition part 5h, and a receiver 5k is provided to be fluidically communicated with the second chamber R2 and the third chamber R3 through connecting pipes 5i and 5j, respectively.

On the other hand, an interior of the tank 5b of the air cooled condenser 5 is divided into two chambers, namely a first chamber R1 and a fourth chamber R4, by a partition part 5m, where the first chamber R1 is provided with an inlet port 5n that is connected with a connecting pipe 9g, and the fourth chamber R4 is provided with an outlet port 5o that is connected with a connecting pipe 9h.

Incidentally, what is called, a blind tube is used for a tube that defines a boundary between the core part 3a of the sub-radiator 3 and the core part 5c of the air cooled condenser 5 so that the flowing medium cannot flow in an interior of the blind tube.

All parts of the composite heat exchanger A of the first embodiment are made of aluminum material, and clad layers, which is formed by using brazing filler material, are placed on one of connecting portions of the parts. Then, the composite heat exchanger A is heat-treated in a heating furnace in a state where it is temporally assembled, so that the connecting portions are integrally joined with each other to integrally form the composite heat exchanger A.

Incidentally, material of the parts of the composite heat exchanger A is not limited to the aluminum material, and they may use appropriate material. For example, in a case where the tanks 2a and 2b (3a and 3b) are made of plastic material and they are caulked with tube plates of the aluminum material, each of the tube 2d, 3d is inserted in and fixed to the corresponding tube plates.

In addition, the water cooled condenser 4 may be pre-brazed once before the above-described brazing process. Further, the receiver 5k may be installed in a post-process.

Next, the operations of the composite heat exchanger and the composite heat exchanger system of the first embodiment will be described.

In the thus-constructed composite heat exchanger A, as shown in FIGS. 1 and 5, the flowing medium at high temperature flows into the tank 2b through the connecting pipe 9a and the input port 2g of the main radiator 2 as indicated by an alternative long and short dash lined arrow, it is cooled down due to heat transfer between the flowing medium and air flow, which is generated when the motor vehicle runs (or forced air flow generated by a not-shown electric motor fan) and runs through the core part 2a, while it passes through the tubes 3d of the core part 2c to enter the tank 2a. Then it is outputted to the connecting pipe 9b through the outlet port 2f.

In addition, a part of the flowing medium that is cooled down by the main radiator 2 is further cooled down due to the heat transfer between the flowing medium and the air flow, which is generated when the motor vehicle runs (or the forced air flow generated by the not-shown electric motor fan) and runs through the core part 3c, while it flows into the tank 3b from the tank 3a of the sub-radiator 3 through the tubes 3d of the core part 3d.

The flowing medium of the tank 3b of the sub-radiator 3 is heat-exchanged between the flowing medium thereof and the flowing medium of the water is cooled condenser 4 as indicated by the alternative long and two-short dash lined arrow, so that the flowing medium of the water cooled condenser 4 is cooled down. Then it flows through the outlet port 3f, the connecting pipes 9d and 9e and the temperature control valve 10 to be then confluent with the flowing medium of the connecting pipe 9b of the main radiator 2.

On the other hand, the flowing medium at high temperature, which is introduced through the connecting pipe 9f and the inlet port 4a of the water cooled condenser 4 as indicated by a broken lined arrow, is cooled down due to heat transfer between the flowing medium thereof and the flowing medium of the sub-radiator 3, then being outputted to the inlet port 5n of the air cooled condenser 5 through the connecting pipe 9g.

Further, the flowing medium, which flows into the first chamber R1 of the tank 5b through the inlet port 5n of the air cooled condenser 5, is cooled down due to heat transfer between the flowing medium thereof and the air flow, which is generated when the motor vehicle runs (or the forced air flow generated by the not-shown electric motor fan) and runs through the core part 5c, while it flows through the tubes 5d corresponding to the first chamber R1 and the second chamber R2 to enter the second chamber R2 of the tank 5a.

Then, the flowing medium in the second chamber R2 is introduced through a connecting pipe 5k to the receiver 5k, where it is gas-liquid separated from each other. Only liquid in the flowing medium flows into the third chamber R3 of the tank 5a through a connecting pipe 5j.

Then, the flowing medium in the third chamber R3 is cooled down due to heat transfer between the flowing medium thereof and the air flow, which is generated when the motor vehicle runs (or the forced air flow generated by the not-shown electric motor fan) and runs through the core part 5c, while it flows through the tubes 5d corresponding to the third chamber R3 and the fourth chamber R4 to enter the fourth chamber R4.

Finally, the flowing medium in the fourth chamber R4 of the tank 5b is discharged to a connecting pipe 9h through the outlet port 5o.

Accordingly, in the composite heat exchanger A of the first embodiment, the part of the flowing medium that is cooled down by the main radiator 2 is introduced to the sub-radiator to be further cooled down, and the further cooled flowing medium cools the flowing medium of the water cooled condenser 4, and then it is joined again with the flowing medium that is cooled down by the main radiator 2.

On the other hand, the flowing medium that is cooled down by the water cooled condenser 4 is introduced to the air cooled condenser 5 to further cool the flowing medium thereof.

Therefore, the sub-radiator 3 aids the main radiator 2, so that the main radiator 2 can be constructed in compact compared to conventional radiators.

Incidentally, according to the experiment results, it is confirmed that the main radiator 2 has the coolability equal to those of the conventional ones even when the thickness of the main radiator 2 is set to be approximately a half of those of the conventional ones.

In addition, the water cooled condenser 4 aids the air cooled condenser 5, so that the core part 5c of the air cooled condenser 5 can be considerably decreased in the dimensions thereof, and the coolability thereof can be improved.

Further, the temperature of the flowing medium of the sub-radiator 3 is controlled by the temperature adjusting valve 10, which can prevent deterioration in the coolability of the engine 1 due to confluence of the flowing medium of the main radiator 2 and the flowing medium of the sub-radiator 3 having a temperature higher than a predetermined one, by the temperature control valve 10 decreasing a flow amount of the flowing medium of the sub-radiator 3 in a case where the temperature of the flowing medium of the sub-radiator 3 at an outlet port side thereof becomes higher than the predetermined one, for example.

In addition, in a case where loads on the main radiator 2 and the condensers 4 and 5 are large, the temperature control valve 10 can adjust the flow amount appropriately according to the load, in such a way that the main radiator 2 and the water cooled condenser 4 are cooled down in priority. Incidentally, when the temperature control valve 10 is narrowed to decrease the flow amount of the sub-radiator 3, the flowing medium flowing through the sub-radiator 3 is further cooled down.

Further, the flow amount adjustment by the temperature control valve 10 may be appropriately set for purposes different from the above-described one.

Next, the effects of the composite heat exchanger and the composite heat exchanger system of the first embodiment will be described.

As explained above, the composite heat exchanger A of the first embodiment includes the air cooled condenser 5 having the pair of tanks 5a and 5b and the core part 5c arranged between the tanks 5a and 5b thereof; the sub-radiator 3 having the pair of tanks 3a and 3b and the core part 3c that is arranged between the tanks 3a and 3b thereof and on the same plane as that of the core part 5c of the air cooled condenser 5, the core part 3c of the sub-radiator 3 being formed with the core part 5c of the air cooled condenser 5 as the one unit; and the main radiator 2 having the pair of tanks 2a and 2b and the core part 2c that is arranged between the tanks 2a and 2b thereof. The tank 3a of the sub-radiator 3 is formed in the state where the tank 3a is communicated with the downstream side tank 2a of the main tank 2, and the tank 3b of the sub-radiator 3 contains the water cooled condenser 4. The part of the flowing medium that is cooled down by the main radiator 2 is introduced in the sub-radiator 3 to cool flowing medium of the water cooled condenser 4, and the flowing medium that is cooled by the water cooled condenser 4 is introduced in the air cooled condenser 5 to be cooled. Therefore, the part of the flowing medium can be used as the flowing medium of the sub-radiator 3, and the main radiator 2, the sub-radiator 3, the water cooled condenser 4 and the air cooled condenser 5, which enables the coolability of mainly the main radiator 2 and the installation thereof on the motor vehicle to be improved.

In addition, the tank 3a of the sub-radiator 3 is formed together with the tank 2a of the main radiator 2 as the one unit in the state where the tank 3a and the tank 2a are fluidically communicated with each other, so that the part of the flowing medium can be flown from the main radiator 2 to the tank 3a of the sub-radiator 3 without increasing heat loss thereof, and the number of the parts can be decreased.

Further, the water cooled condenser 4 is contained in the tank 3b of the sub-radiator 3, so that the flowing medium that is cooled down by the main radiator 2 can be further cooled down by the core part 3c of the sub-radiator 3 to cool the flowing medium of the water cooled condenser 4. Therefore, it can improve the coolability of the water cooled condenser 4 compared to the case where the flowing medium that is cooled down by the main radiator 2 directly cools the flowing medium of the water cooled condenser 4.

Further, the temperature control valve 10 is provided at the outlet port side of the flowing medium of the sub-radiator 3 so that it decreases the flow amount of the flowing medium from the sub-radiator 3 to the main radiator 2 in a case where the temperature at the outlet port side of the flowing medium of the sub-radiator 3 becomes higher than the predetermined one. Therefore, it can prevent the deterioration in the coolability of the engine 1 due to the confluence of the high-temperature flowing medium of the sub-radiator 3 and the flowing medium of the main radiator 2.

Second Embodiment

Hereinafter, a composite heat exchanger and a composite heat exchanger system of a second embodiment according to the present invention will be described. Incidentally, parts of a construction of the second embodiment similar to those of the first embodiment are indicated by the same reference numbers, and their explanations will be omitted, while only its different parts will be described.

Figure 6:
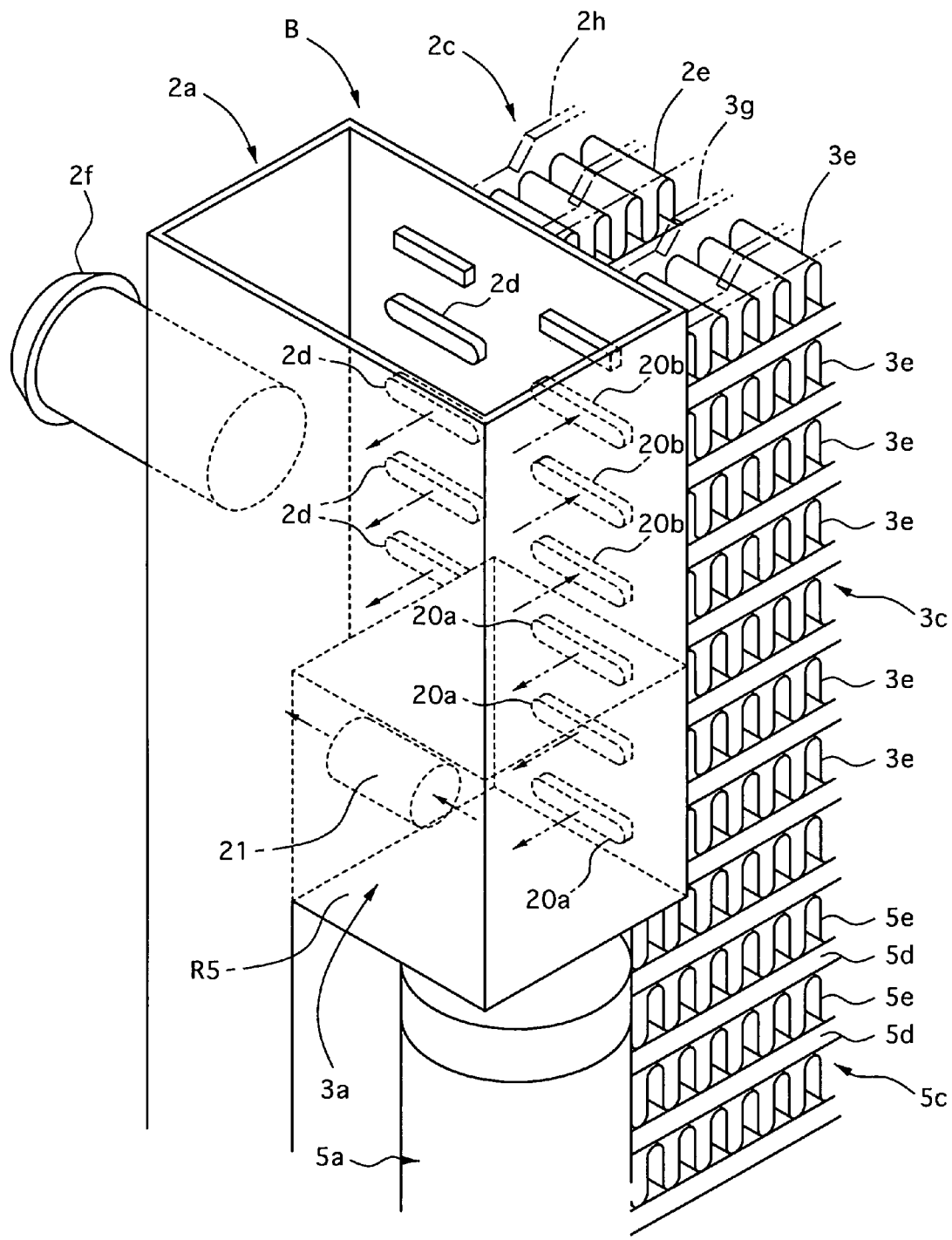
FIG. 6 is an enlarged view illustrating an interior of a tank of a sub-radiator that is used in a second embodiment of the present invention.
Figure 7:
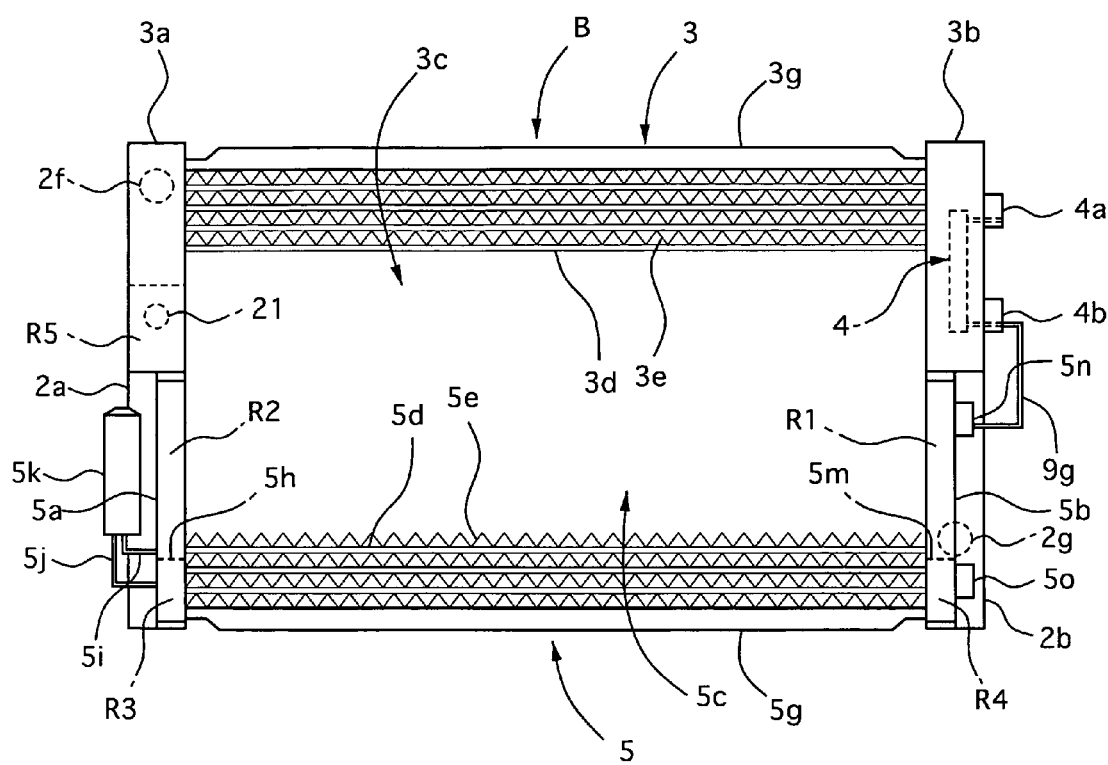
FIG. 7 is a front view of a composite heat exchanger of the second embodiment.
Figure 8:
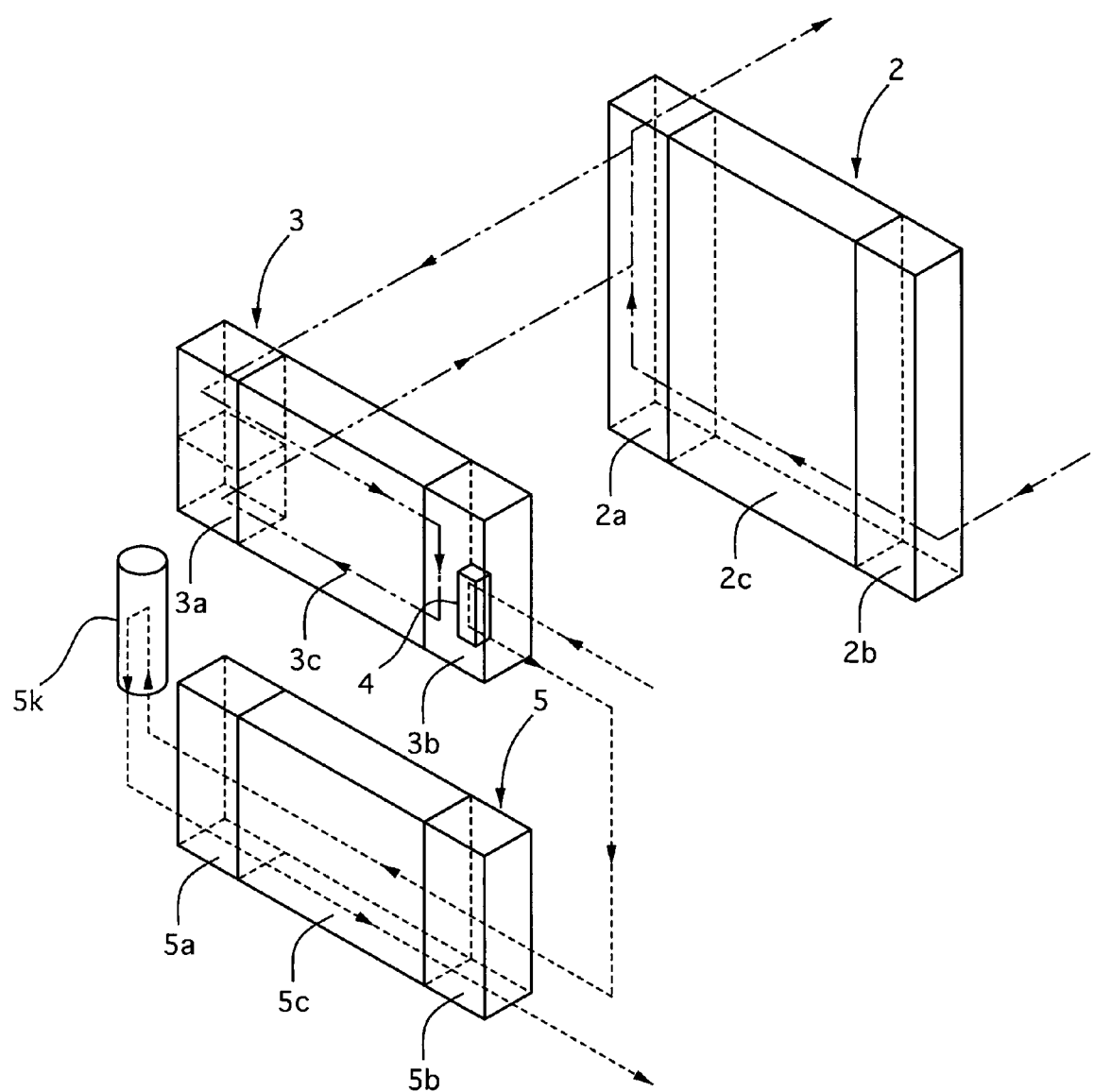
FIG. 8 is a diagram illustrating flow directions of flowing medium of the composite heat exchanger of the second embodiment.

FIG. 6 is a view illustrating an interior of a tank of a sub-radiator of the second embodiment according to the present invention, FIG. 7 is a front view of a composite heat exchanger of the second embodiment, and FIG. 8 is a diagram illustrating flow directions of flowing medium of the composite heat exchanger of the second embodiment.

As shown in FIGS. 6 and 7, in the composite heat exchanger B of the second embodiment, an interior of a tank 3a of a sub-radiator 3 is divided to form a fifth chamber R5. The fifth chamber R5 is fluidically communicated with tubes 20a of a lower portion of a core part 3c, and it is also fluidically communicated with a tank 2a of a main tank 3 through a connecting port 21.

In addition, the outlet port 3f of the sub-radiator 3 of the first embodiment is removed from the second embodiment, which is different from the first embodiment.

In the thus-constructed composite heat exchanger B, as shown in FIG. 8, a part of flowing medium that is cooled down by the main radiator 2 is further cooled down due to heat transfer between the flowing medium and air flow, which is generated when a motor vehicle runs (or forced air flow generated by a not-shown electric motor fan) and runs through a core part 3c of the sub-radiator 3, while it flows into the tank 3b through tubes 20b, shown in FIG. 6, of an upper portion of the core part 3c, as indicated by an alternative long and two-short dash lined arrow.

Then, the flowing medium of the sub-radiator 3 that flows into the tank 3b cools flowing medium of a water cooled condenser 4 due to heat transfer between the flowing medium of the sub-radiator 3 and the flowing medium of the water cooled condenser 4. The flowing medium of the sub-radiator 3 is further cooled down due to heat transfer between the flowing medium thereof and the air flow, which is generated when the motor vehicle runs (or the forced air flow generated by the not-shown electric fan) and runs through the core part 3c, while it flows into the fifth chamber R5 through the tubes of the lower portion of the core part 3c.

Then, the flowing medium that flows into the fifth chamber R5 joins together with the flowing medium of the tank 2a of the main radiator 2 through the connecting port 21.

Incidentally, in the connecting port 21, there is provided a check valve that allows the flowing medium to flow only in a direction from the fifth chamber R5 toward the tank 2a, and there is also provided a temperature control valve 10 that is described above.

Therefore, in the composite heat exchanger B of the second embodiment, the flowing medium of the sub-radiator 3 is turned between the tanks 3a and 3b, so that the flowing medium of the sub-radiator 3, which heat-exchanges with the flowing medium of the water cooled condenser 4 in the tank 3b to have a slightly high temperature, is turned to be cooled down. Then, it joins together with the flowing medium of the main radiator 2 in the tank 3a. This can prevent the flowing medium of the sub-radiator 3, which joins with the flowing medium of the main radiator 2, from becoming high temperature, thereby the sub-radiator 3 surely aiding the main radiator 2.

Incidentally, in the second embodiment, the flowing medium of the sub-radiator 3 is turned only once between the tanks 3s and 3b, while it may be turned more than once.

In addition, in the second embodiment, the outlet port 3f and the connecting pipes 9d and 9e of the first embodiment can be removed, so that an entire construction of the composite heat exchanger B can be smaller in dimensions, and it can be easily installed on the motor vehicle because of reduction in piping work.

Third Embodiment

Hereinafter, a composite heat exchanger and a composite heat exchanger system of a third embodiment according to the present invention will be described. Incidentally, parts of a construction of the third embodiment similar to those of the second embodiment are indicated by the same reference numbers, and their explanations will be omitted, while only its different parts will be described.

Figure 9:
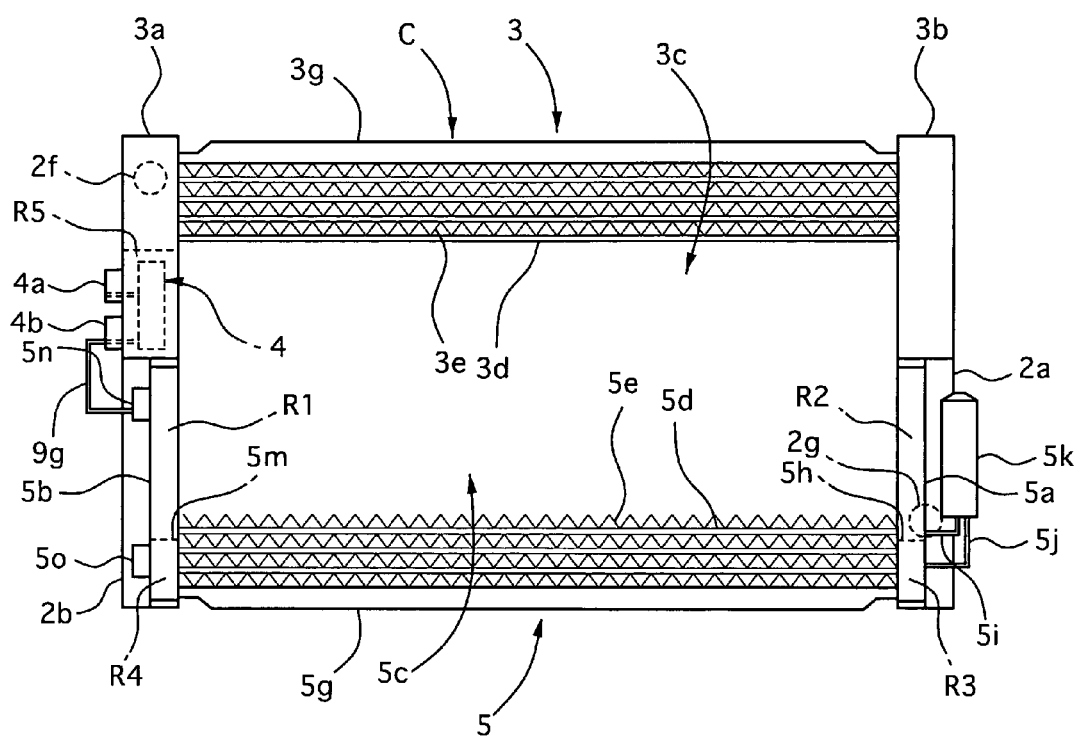
FIG. 9 is a front view of a composite heat exchanger of a third embodiment of the present invention.

FIG. 9 is a front view of a composite heat exchanger of the third embodiment according to the present invention.

As shown in FIG. 9, in the third embodiment, a water cooled condenser 4 is contained in a fifth chamber R5, which has been explained in the second embodiment, and tanks 5a and 5b of an air cooled condenser 5 are arranged bilaterally-symmetrically to those of the second embodiment. These are different from the second embodiment.

In the thus-constructed composite heat exchanger C, flowing medium of the water cooled condenser 4 is turned once between tanks 3a and 3b of a sub-radiator 3 to be cooled down by the flowing medium that has a temperature lower than the returned flowing medium, thereby the coolability of the water cooled condenser 4 being improved.

Incidentally, the flowing medium of the sub-radiator 3 is turned between the tanks 3a and 3b only once, while it may be turned more than once. It is important that the fifth chamber R5 is provided in the tank 3b in which the flowing medium finally flows, and that the water cooled condenser 4 is contained in the fifth room R5.

Fourth Embodiment

Hereinafter, a composite heat exchanger and a composite heat exchanger system of a fourth embodiment according to the present invention will be described. Incidentally, parts of a construction of the fourth embodiment similar to those of the first embodiment are indicated by the same reference numbers, and their explanations will be omitted, while only its different parts will be described.

Figure 10:
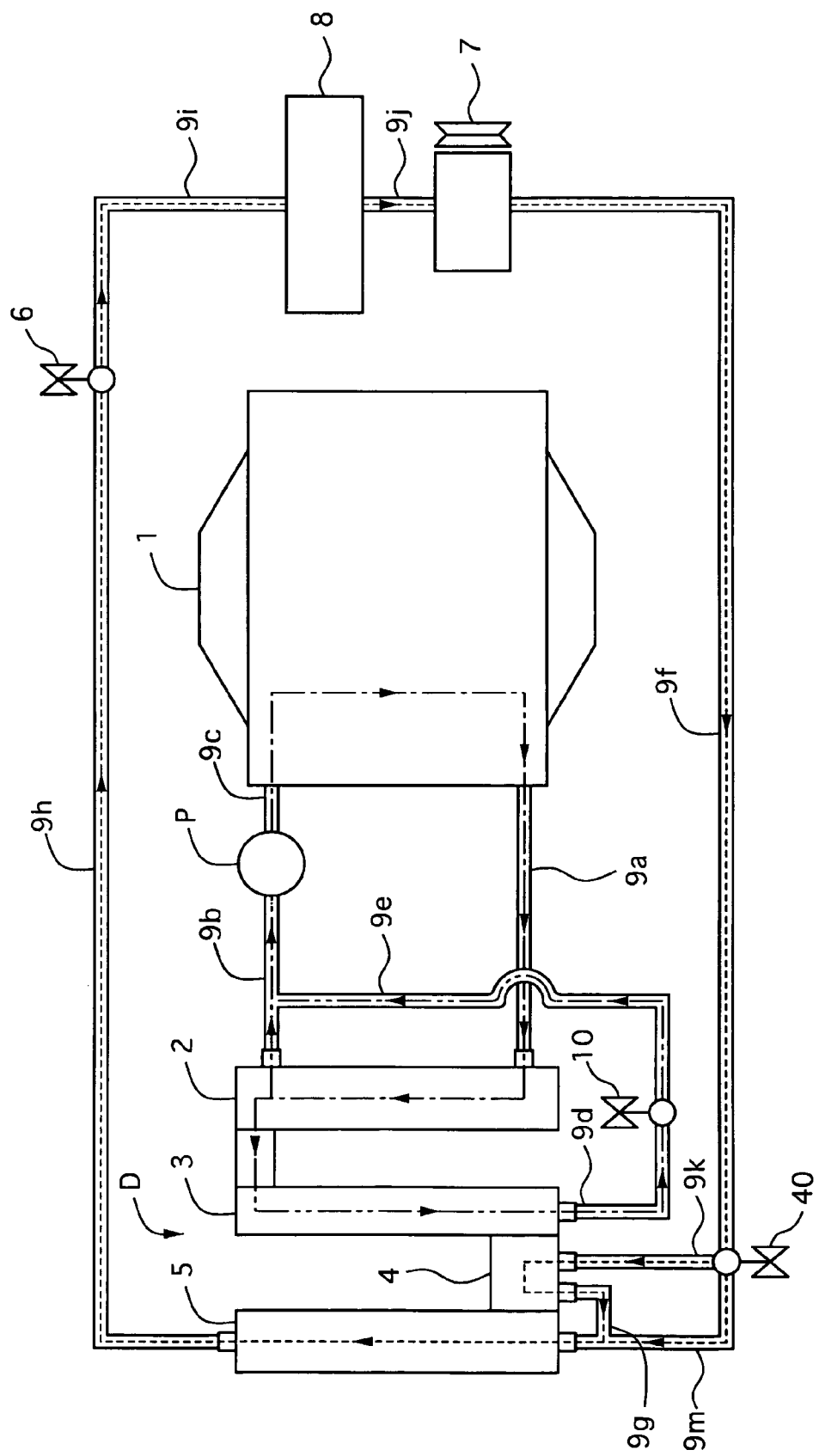
FIG. 10 is a diagram showing a system configuration of a composite heat exchanger of a fourth embodiment of the present invention.

FIG. 10 is a diagram of a system configuration of a composite heat exchanger of a fourth embodiment according to the present invention.

As shown in FIG. 10, in the fourth embodiment, a shift control valve 40 is provided so that it can shift between a first flow passage and a second flow passage, which s different from the first embodiment, where the first flow passage introduces flowing medium in a connecting pipe 9f to a water cooled condenser 4 and an air cooled condenser 5 in these order through a connecting pipe 9k, and the second flow passage introduces it to the air cooled condenser 5 through a connecting pipe 9m. The shift control valve 40 corresponds to a shift control means of the present invention. In addition, a check valve is disposed in an interior of a connecting pipe 9g.

In the thus-constructed composite heat exchanger D, it is possible to control a function of the water cooled condenser 4 to be halted by the shift control valve 40 so as to directly introducing the flowing medium, which flows through the compressor 7 and a connecting pipe 9f, into the air cooled condenser 5 in a case where load of the main radiator 2 is large, for instance.

As a result, the main radiator 2 can address large load and accordingly it can be applied to high output of engines, with only the air cooled condenser being activated to obtain an air conditioning function. Incidentally, open and close control of the shift control valve 40 may be appropriately set differently from the above-described setting.

Therefore, in the fourth embodiment, the shift control valve 40 is provided to shift to flow the flowing medium to one of the first flow passage where the flow medium flows through the water cooled condenser 4 and the air cooled condenser 5 and the second flow passage where the flowing medium flows only through the air cooled condenser 5, thereby the maim radiator 2 having an ability to address the large load.

Fifth Embodiment

Hereinafter, a composite heat exchanger and a composite heat exchanger system of a fifth embodiment according to the present invention will be described. Incidentally, parts of a construction of the fifth embodiment similar to those of the first embodiment are indicated by the same reference numbers, and their explanations will be omitted, while only its different parts will be described.

Figure 11:
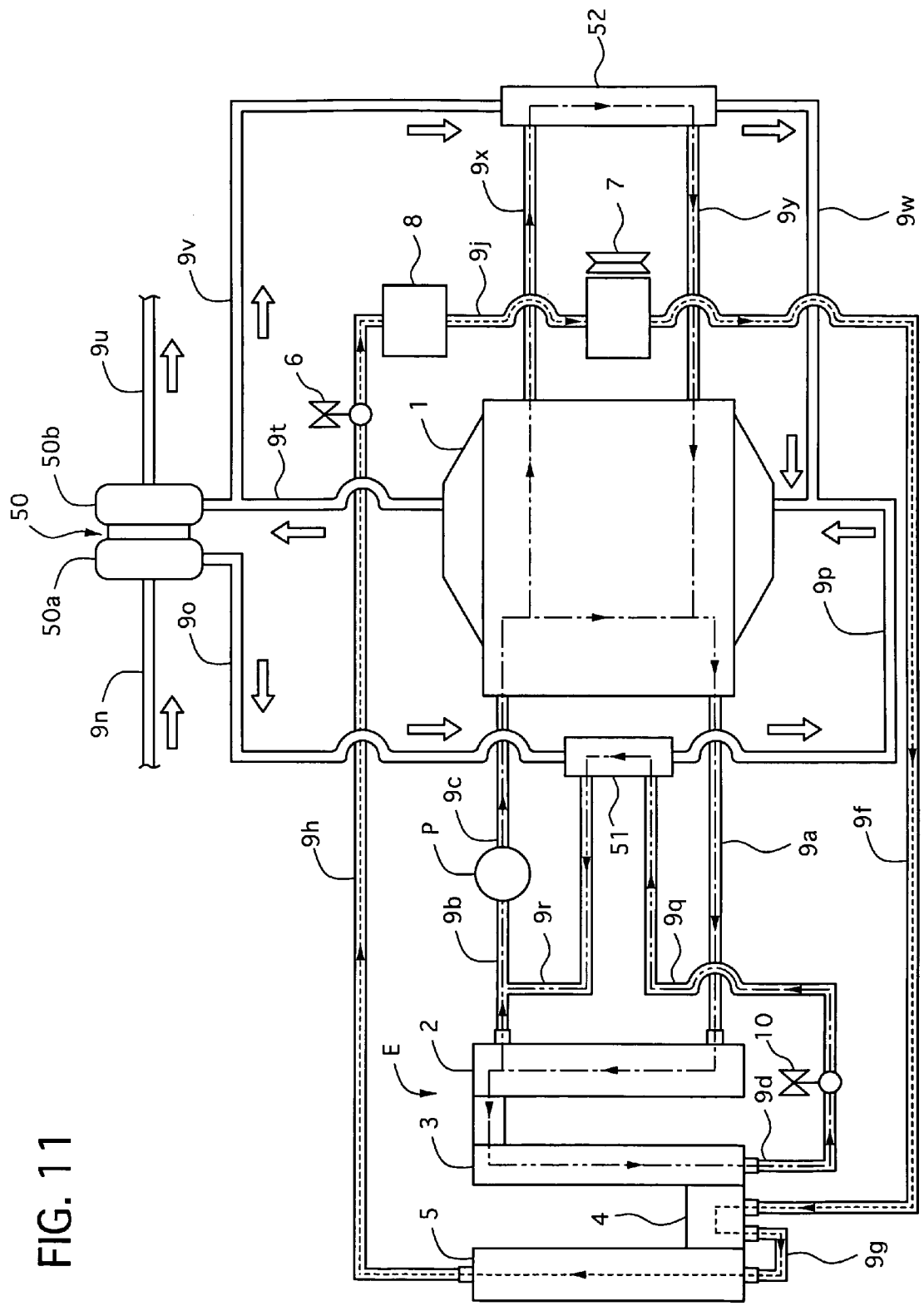
FIG. 11 is a diagram showing a system configuration of a composite heat exchanger of a fifth embodiment of the present invention.

FIG. 11 is a diagram of a composite heat exchanger and a composite heat exchanger system of a fifth embodiment according to the present invention.

As shown in FIG. 11, in the fifth embodiment, a combination of a turbocharger device and an exhaust gas recirculation (EGR) device is used.

Specifically, the air that is introduced from a not-shown air-cleaner is introduced to a compressor 50a of the turbocharger 50 through an intake pipe 9n, and it is introduced to a water cooled intercooler 51 to be cooled after compressed by the compressor 50a. Then the cooled air is distributed to each cylinder, not-shown, of an engine 1 through an intake manifold 9p.

In addition, the flowing medium that is cooled down to approximately 40° C. by a sub-radiator 3 is introduced to the water cooled intercooler 51 through connecting pipes 9d and 9q and a temperature control valve 10. The flowing medium that is discharged from the water cooled intercooler 51 at approximately 70° C. is joined together with flowing medium of a main radiator 2 through a connecting pipe 9r.

Therefore, in the composite heat exchanger E of the fifth embodiment, the flowing medium that is cooled down by the sub-radiator 3 is introduced to the water cooled intercooler 51 to effectively cool exhaust gas. In addition, an exhaust resistance thereof can be decreased, thereby improving a response of the turbocharger 50 and preventing adverse influences on an air conditioning device.

On the other hand, the exhaust gas discharged from the engine 1 is introduced to the turbocharger 50 through the exhaust manifold 9t to drive a turbine 50b thereof, then being discharged in the atmosphere.

Further, a part of the exhaust gas in the exhaust manifold 9t is introduced to an EGR cooler 52 through a connecting pipe 9v, and the exhaust gas outputted from the EGR cooler 52 is lead to an intake manifold 9p through a connecting pipe 9w.

In this operation, the EGR cooler 52 cools the exhaust gas by introducing the part of the flowing medium that circulates between the engine 1 and the radiator 2 through connecting pipes 9x and 9y.

Incidentally, the EGR cooler is not indispensable.

In addition, a connecting pipe 9w at an outlet port side of the EGR cooler may be connected with a connecting pipe 9o.

Further, an air cooled intercooler may be directly connected with an upstream portion or a downstream portion of the water cooled intercooler.

Sixth Embodiment

Hereinafter, a composite heat exchanger and a composite heat exchanger system of a sixth embodiment according to the present invention will be described. Incidentally, parts of a construction of the sixth embodiment similar to those of the second embodiment are indicated by the same reference numbers, and their explanations will be omitted, while only its different parts will be described.

Figure 12:
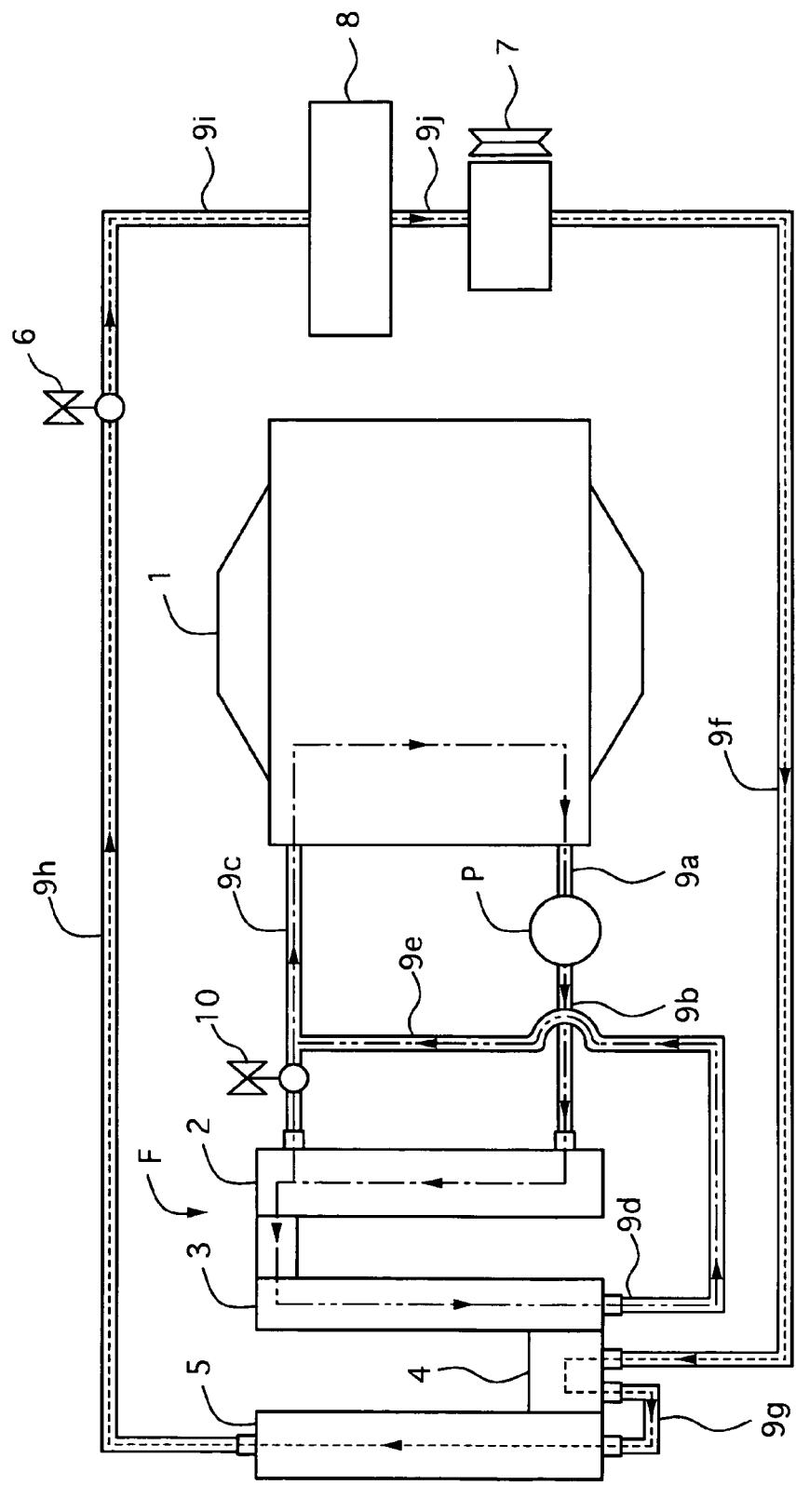
FIG. 12 is a diagram showing a system configuration of a composite heat exchanger of a sixth embodiment of the present invention.
Figure 13:
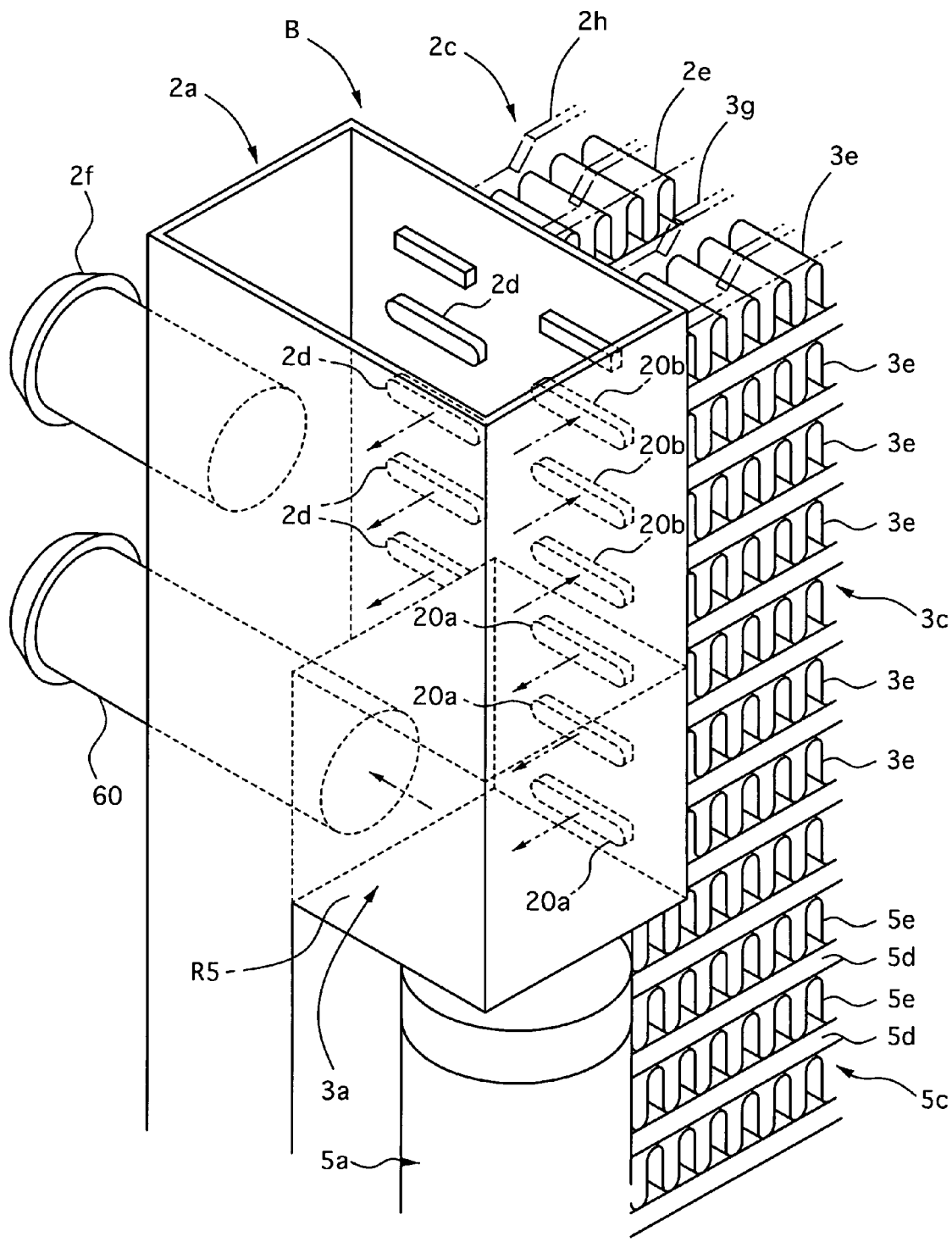
FIG. 13 is a view illustrating an interior of a tank of a sub-radiator that is used in the sixth embodiment.

FIG. 12 is a diagram of a system configuration of a composite heat exchanger of a sixth embodiment according to the present invention, and FIG. 13 is a view illustrating an interior of a tank of a sub-radiator of the sixth embodiment.

As shown in FIG. 12, in the composite heat exchanger F of the sixth embodiment, a temperature control valve 10 is disposed at an upstream side of a confluence of a connecting pipe 9c and a connecting pipe 9e near an outlet port 2f of flowing medium of a main radiator 2, which is different from the second embodiment.

Incidentally, in a case where the main radiator 2 and a sub-radiator 3 is formed as one unit, the temperature control valve 10 in the outlet port 2f of the main radiator 2 as shown in FIG. 13, and an outlet port 60 is provided to project outwardly from a tank 2a in a state where it is fluidically communicated with a fifth chamber R5, instead of the output port 21 of the sub-radiator 3 which has been explained in the second embodiment.

Incidentally, an end portion of the outlet port 60 is directly fluidically communicated with the temperature control valve 10 at an immediate downstream side thereof through a connecting pipe 9e.

Therefore, in the composite heat exchanger F of the sixth embodiment, the flowing medium that flows into the tank 2a of the main radiator 2 can be surely flown in the sub-radiator 3 by the temperature control valve 10 controlling a flow amount thereof, so that stable coolability can be obtained.

While there have been particularly shown and described with reference to preferred embodiments thereof, the invention is not limited to the embodiments, and their design changes and modifications that do not deviate from a subject-matter of the present invention are included in the present invention.

For example, installation positions and the number of the temperature control valve 10 and the shift control valve 40 may be set appropriately, and they may be integrally controlled in connection with each other.

Further, the flowing medium that is cooled down by the sub-radiator 3 may be returned to the engine 1 through an alternator, an electric motor and an inverter circuit of a hybrid electric vehicle or a fuel-cell electric vehicle, and others.

The invention claimed is:

1. A composite heat exchanger comprising:
   an air cooled condenser having a pair of tanks and a core part arranged between the tanks thereof;
   a sub-radiator having a pair of tanks and a core part that is arranged between the tanks thereof and on a same plane as a plane of the core part of the air cooled condenser, the core part of the sub-radiator being formed with the core part of the air cooled condenser as one unit; and
   a main radiator having a pair of tanks and a core part that is arranged between the tanks thereof, wherein
   one of the tanks of the sub-radiator is formed in a state where the one of the tanks is communicated with a downstream side tank of the tanks of the main radiator such that the one of the tanks of the sub-radiator is provided to project forward from the downstream side tank of the main radiator, having a rectangular box shape, so that the one of the tanks of the sub-radiator and the downstream side tank of the main radiator are formed as one unit,
   another tank of the tanks of the sub-radiator is apart from an upstream side tank of the main radiator,
   one of the tanks of the sub-radiator contains a water cooled condenser, and
   a part of a flowing medium that is cooled down by the main radiator is introduced into the sub-radiator to cool a flowing medium of the water cooled condenser, and the flowing medium that is cooled by the water cooled condenser is introduced into the air cooled condenser to be cooled.

2. The composite heat exchanger according to claim 1, wherein
   the one of the tanks of the sub-radiator that contains the water cooled condenser is a downstream side tank of the sub-radiator.

3. The composite heat exchanger according to claim 1, wherein
   the tanks of the sub-radiator are constructed so that the flowing medium of the sub-radiator can be turned between the tanks of the sub-radiator.

4. The composite heat exchanger according to claim 3, wherein
   the water cooled condenser is contained in the one of the tanks of the sub-radiator in which the flowing medium that turns between the tanks of the sub-radiator flows finally.

5. The composite heat exchanger according to claim 1, further comprising:
   a temperature regulating means provided at an outlet port side of the flowing medium of the sub-radiator, wherein
   the temperature regulating means decreases a flow amount of the flowing medium of the sub-radiator in a case where a temperature of the flowing medium of the sub-radiator at the outlet port side becomes higher than a predetermined temperature.

6. The composite heat exchanger according to claim 1, further comprising:
   a temperature regulating means provided at an outlet port side of the flowing medium of the main radiator, wherein
   the temperature regulating means decreases a flow amount of the flowing medium of the sub-radiator in a case where a temperature of the flowing medium of the sub-radiator at the outlet port side becomes higher than a predetermined temperature.

7. The composite heat exchanger according to claim 1, further comprising:
   a shift control means provided so that the shift control means shifts the flowing medium of the water cooled condenser discharged from a compressor to flow into only one of the water cooled condenser and the air cooled condenser.

8. The composite heat exchanger according to claim 2, wherein
   the tanks of the sub-radiator are constructed so that the flowing medium of the sub-radiator can be turned between the tanks of the sub-radiator.

9. The composite heat exchanger according to claim 2, further comprising:
   a temperature regulating means provided at an outlet port side of the flowing medium of the sub-radiator, wherein
   the temperature regulating means decreases a flow amount of the flowing medium of the sub-radiator in a case where a temperature of the flowing medium of the sub-radiator at the outlet port side becomes higher than a predetermined temperature.

10. The composite heat exchanger according to claim 3, further comprising:
    a temperature regulating means provided at an outlet port side of the flowing medium of the sub-radiator, wherein
    the temperature regulating means decreases a flow amount of the flowing medium of the sub-radiator in a case where a temperature of the flowing medium of the sub-radiator at the outlet port side becomes higher than a predetermined temperature.

11. The composite heat exchanger according to claim 4, further comprising:
    a temperature regulating means provided at an outlet port side of the flowing medium of the sub-radiator, wherein
    the temperature regulating means decreases a flow amount of the flowing medium of the sub-radiator in a case where a temperature of the flowing medium of the sub-radiator at the outlet port side becomes higher than a predetermined temperature.

* * * * *